US012541832B2

(12) United States Patent
Zhao et al.

(10) Patent No.: US 12,541,832 B2
(45) Date of Patent: Feb. 3, 2026

(54) IMAGE-STATISTICS-BASED DE-BANDING IN SDR TO HDR CONVERSION

(71) Applicant: Samsung Electronics Co., Ltd., Suwon-si (KR)

(72) Inventors: Tingting Zhao, Irvine, CA (US); Chang Su, Foothill Ranch, CA (US); Chenguang Liu, Tustin, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 191 days.

(21) Appl. No.: 18/496,317

(22) Filed: Oct. 27, 2023

(65) Prior Publication Data

US 2024/0221134 A1 Jul. 4, 2024

Related U.S. Application Data

(60) Provisional application No. 63/435,629, filed on Dec. 28, 2022.

(51) Int. Cl.
*G06T 5/92* (2024.01)
(52) U.S. Cl.
CPC ...... *G06T 5/92* (2024.01); *G06T 2207/20208* (2013.01)
(58) Field of Classification Search
None
See application file for complete search history.

(56) References Cited

U.S. PATENT DOCUMENTS

| 9,607,364 | B2 | 3/2017 | Xu et al. |
| 10,043,251 | B2 | 8/2018 | Huang et al. |
| 10,572,984 | B2 | 2/2020 | Jolly et al. |
| 11,341,624 | B2 | 5/2022 | Gadgil et al. |

(Continued)

FOREIGN PATENT DOCUMENTS

| CN | 108769804 B | 12/2020 |
| CN | 114331871 A | 4/2022 |

(Continued)

OTHER PUBLICATIONS

N. J. Gadgil, Q. Song and G.-M. Su, "Efficient Banding-Alleviating Inverse Tone Mapping for High Dynamic Range Video," 2019 53rd Asilomar Conference on Signals, Systems, and Computers, Pacific Grove, CA, USA, 2019, pp. 1885-1889, doi: 10.1109/IEEECONF44664. 2019.9048707. (Year: 2019).*

(Continued)

*Primary Examiner* — Miya J Cato
(74) *Attorney, Agent, or Firm* — Sherman IP LLP; Kenneth L. Sherman; Steven Laut

(57) ABSTRACT

One embodiment provides a computer-implemented method that includes employing a de-banding process based on image statistics in a dynamic range conversion system, including high dynamic range (HDR) to standard dynamic range (SDR) tone mapping (TM) process or SDR-to-HDR inverse tone mapping (ITM) process. A computing device performs the de-banding process in post-processing during a determination of one or more initial ITM explicit polynomial curve coefficients. One or more parameters of a weighing function of the one or more initial ITM explicit curve coefficients are utilized as one or more controlling knots for balancing a de-banding effect and preserving local detail.

20 Claims, 8 Drawing Sheets

(56) References Cited

U.S. PATENT DOCUMENTS

| | | | |
|---|---|---|---|
| 2016/0358319 A1* | 12/2016 | Xu | H04N 1/6027 |
| 2017/0103729 A1* | 4/2017 | Huang | H04N 5/76 |
| 2017/0337670 A1* | 11/2017 | Guermoud | G06T 5/20 |
| 2021/0166360 A1* | 6/2021 | Kim | G06T 5/60 |
| 2023/0059233 A1 | 2/2023 | Kim et al. | |
| 2024/0095893 A1* | 3/2024 | Su | H04N 19/98 |
| 2025/0234051 A1* | 7/2025 | Gadgil | H04N 19/117 |

FOREIGN PATENT DOCUMENTS

| | | | |
|---|---|---|---|
| CN | 115457920 A | 12/2022 | |
| WO | WO-2021259613 A1 * | 12/2021 | G06T 5/40 |
| WO | 2023-096728 A | 6/2023 | |

OTHER PUBLICATIONS

International Search Report and Written Opinion dated Feb. 22, 2024 for International Application PCT/KR2023/018389, from Korean Intellectual Property Office, pp. 1-9, Republic of Korea.

Extended European Search Report dated Oct. 6, 2025 for European Patent Application No. 23912570.1, from European Patent Office, pp. 1-8, Germany.

Gadgil, N. et al., "Efficient Banding-Alleviating Inverse Tone Mapping for High Dynamic Range Video", 53rd Asilomar Conference on Signals, Systems, and Computers, Nov. 3, 2019, pp. 1885-1889, IEEE, United States.

* cited by examiner

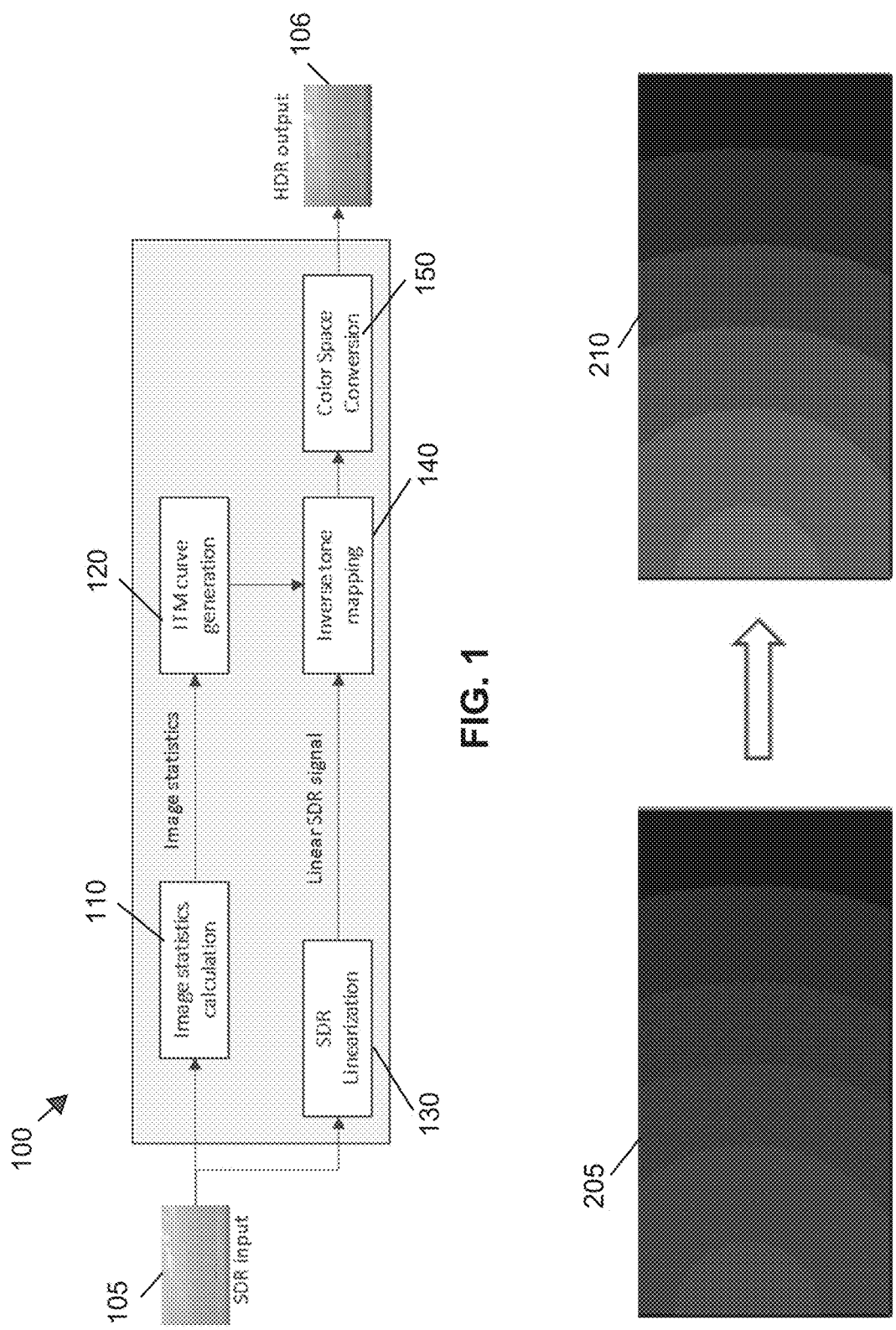

900

Employing A De-Banding Process Based On Image Statistics In A Dynamic Range Conversion System, Including High Dynamic Range (HDR) To Standard Dynamic Range (SDR) Tone Mapping (TM) Process Or SDR-To-HDR Inverse Tone Mapping (ITM) Process ─ 910

Performing, By A Computing Device, The De-Banding Process In Post-Processing During A Determination Of One Or More Initial ITM Explicit Polynomial Curve Coefficients ─ 920

Utilizing One Or More Parameters Of A Weighing Function Of The One Or More Initial ITM Explicit Curve Coefficients As One Or More Controlling Knots For Balancing A De-Banding Effect And Preserving Local Detail ─ 930

FIG. 9

IMAGE-STATISTICS-BASED DE-BANDING IN SDR TO HDR CONVERSION

CROSS-REFERENCE TO RELATED APPLICATIONS

This application claims the priority benefit of U.S. Provisional Patent Application Ser. No. 63/435,629, Dec. 28, 2022, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to image tone mapping, and in particular, to balancing a de-banding effect and preserving local detail for a display.

BACKGROUND

While high dynamic range (HDR) standards have commercially emerged in as early as 2014, the end-to-end processing from capture, creation, distribution to display did not mature until fairly recently. Therefore, the majority of the videos available nowadays is still limited by the standard dynamic range (SDR), which evokes the need of SDR-to-HDR inverse tone-mapping (ITM) techniques. ITM allows SDR contents to seamlessly blend into the HDR-native productions.

SUMMARY

One embodiment provides a computer-implemented method that includes employing a de-banding process based on image statistics in a dynamic range conversion system, including high dynamic range (HDR) to standard dynamic range (SDR) tone mapping (TM) process or SDR-to-HDR inverse tone mapping (ITM) process. A computing device performs the de-banding process in post-processing during a determination of one or more initial ITM explicit polynomial curve coefficients. One or more parameters of a weighing function of the one or more initial ITM explicit curve coefficients are utilized as one or more controlling knots for balancing a de-banding effect and preserving local detail.

Another embodiment includes a non-transitory processor-readable medium that includes a program that when executed by a processor performs balancing a de-banding effect and preserving local detail for a display, including employing a de-banding process, by the processor, based on image statistics in a dynamic range conversion system, including HDR-to-SDR TM process or SDR-to-HDR ITM process. The de-banding process is performed in post-processing during a determination of one or more initial ITM explicit polynomial curve coefficients. One or more parameters of a weighing function of the one or more initial ITM explicit curve coefficients is utilized as one or more controlling knots for balancing a de-banding effect and preserving local detail.

Still another embodiment provides an apparatus that includes a memory storing instructions, and at least one processor executes the instructions including a process configured to employ a de-banding process based on image statistics in a dynamic range conversion system, including HDR-to-SDR TM process or SDR-to-HDR ITM process. The de-banding process is performed in post-processing during a determination of one or more initial ITM explicit polynomial curve coefficients. One or more parameters of a weighing function of the one or more initial ITM explicit curve coefficients is utilized as one or more controlling knots for balancing a de-banding effect and preserving local detail.

These and other features, aspects and advantages of the one or more embodiments will become understood with reference to the following description, appended claims and accompanying figures.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 1 illustrates an example of a standard dynamic range (SDR) to high dynamic range (HDR) inverse tone mapping (ITM) process;

FIG. 2 illustrates an example of banding artifacts that are enhanced after luminance range expansion;

FIG. 9 illustrates a process for balancing a de-banding effect and preserving local detail for a display, according to some embodiments.

DETAILED DESCRIPTION

Figure 3:
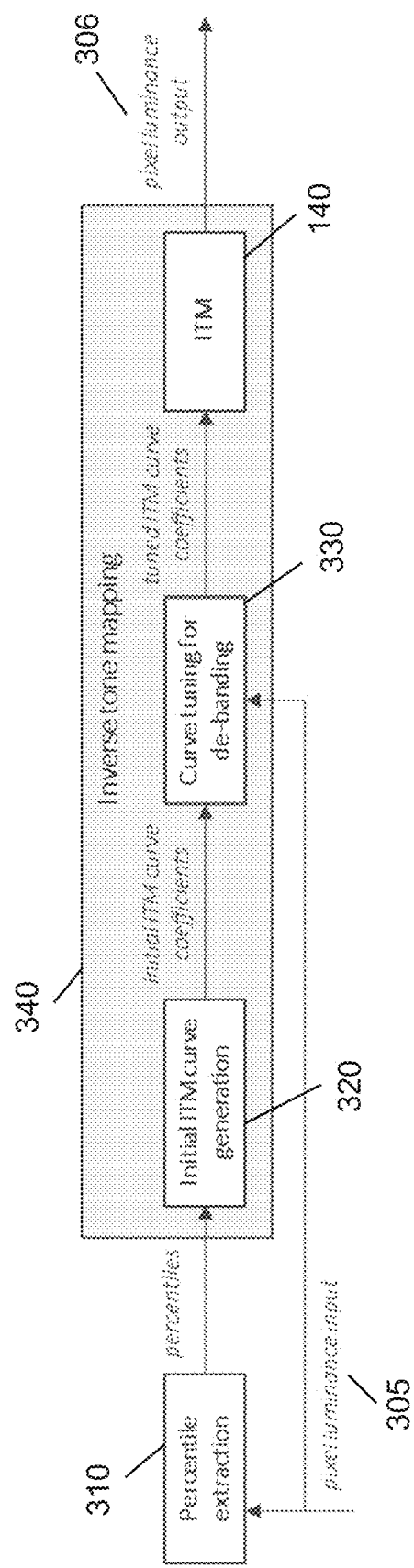
FIG. 3 illustrates a block diagram of an SDR-to-HDR conversion system including a de-banding process, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

A description of example embodiments is provided on the following pages. The text and figures are provided solely as examples to aid the reader in understanding the disclosed technology. They are not intended and are not to be construed as limiting the scope of this disclosed technology in any manner. Although certain embodiments and examples have been provided, it will be apparent to those skilled in the art based on the disclosures herein that changes in the embodiments and examples shown may be made without departing from the scope of this disclosed technology.

One or more embodiments relate generally to image tone mapping, and in particular, to balancing a de-banding effect and preserving local detail for a display. One embodiment provides a computer-implemented method that includes employing a de-banding process based on image statistics in a dynamic range conversion system, including high dynamic range (HDR) to standard dynamic range (SDR) tone mapping (TM) process or SDR-to-HDR inverse tone mapping (ITM) process. A computing device performs the de-banding process in post-processing during a determination of one or more initial ITM explicit polynomial curve coefficients. One or more parameters of a weighing function of the one or more initial ITM explicit curve coefficients are utilized as one or more controlling knots for balancing a de-banding effect and preserving local detail.

Among the current publications and industry uses, global solution with independent pixel-wise processing is the most computationally efficient choice with compromised de-banding effect. Methods based on local context, such as filtering-based, can achieve a decent de-banding performance but usually sacrifices the local details. Additionally, the application of those context-dependent solutions highly relies on the available hardware computation resources.

In some embodiments, the disclosed technology provides a global de-banding solution, which can be easily embedded into current SDR-to-HDR conversion techniques without changing the system structure. In one or more embodiments, the ITM curve is flattened to reduce the distance between neighboring color/luminance levels, therein suppress (hide) the banding artifact.

As banding artifacts are mostly noticeable in big and smooth regions, such as the sky, it is reasonable to assume that the shadow (highlight) region in an overall dark (bright) scene is more vulnerable to banding artifacts. Therefore, the banding-risk luminance range is determined based on the brightness statistics of the image in this solution. Also, mid-tone region usually has more details to be protected, so only lower-end and higher-end of the ITM curve are flattened in this solution to suppress the shadow and highlight bandings, respectively. Additionally, based on experiment observation, increasing (decreasing) the brightness of an image reduces the highlight (shadow) bandings, so this solution will flatten the ITM curve by lifting the higher-end while suppressing the lower-end.

In one or more embodiments, the disclosed technology provides a global de-banding solution in SDR-to-HDR ITM based on image statistics. Unlike some approaches, the disclosed technology can determine the luminance range vulnerable to banding artifacts and treat all pixels globally based on the luminance statistics. In this way, the disclosed technology achieves a pleasant balance, without the heavy computation burden from some context-based solutions or the performance compromise due to the blind global processing. This de-banding solution works as a post-processing of the initial ITM Explicit Bezier curve coefficients, so it may be naturally embedded into a SDR-to-HDR conversion platform without causing significant or any system structure change. In some embodiments, parameters designed for a weighting function of the ITM explicit Bezier curve coefficients may be used as controlling knots for users to balance the de-banding effect and preserving the local details.

FIG. 1 illustrates an example of an SDR to HDR ITM process 100. Process 100 includes an SDR input 105, image statistics calculation 110, ITM curve generation 120, SDR linearization 130, ITM 140, color space conversion 150 and HDR output 106. A global solution with independent pixel-wise processing can be a promising and computationally efficient approach with a compromised de-banding effect. Approaches based on local context, such as the filtering-based, can achieve a decent de-banding performance but usually sacrifices the local details. Additionally, the application of those context-dependent solutions highly relies on the available hardware computation resources. In some embodiments, in contrast to process 100, the disclosed technology provides a global de-banding solution, which may be efficiently embedded into an SDR-to-HDR conversion without changing a system structure(s).

FIG. 2 illustrates an example of banding artifacts 205 that are enhanced after luminance range expansion. Expansion of the luminance range of SDR by ITM (typically from hundreds of nits to thousands of nits) can enhance the step boundaries and cause banding artifacts 210 (also referred to as ringing/contour artifacts), which results in degraded quality of a HDR display.

FIG. 3 illustrates a block diagram of an SDR-to-HDR conversion system including a de-banding process 330, according to some embodiments. In one or more embodiments, the system includes pixel luminance input 305, percentile extraction processing 310, ITM processing 340 that includes initial ITM curve generation 320, curve tuning for de-banding 330 (or the de-banding process), ITM 140 and pixel luminance output 306.

In some embodiments, image statistics information from SDR metadata or calculated on device, is denoted by S. In one or more embodiments, the $50^{th}$ and $90^{th}$ percentiles of luminance are used as a practical example, i.e., $S=\{p_{50th}, p_{90th}\}$. Other definition/approximation of luminance statistics may also be used. In order to obtain luminance percentiles from the percentile extraction processing 310: pixel luminance obtained as the max value of R, G, B channels for the given pixel i is used as a practical example: $x_i=\max(R_i, G_i, B_i)$. In one or more embodiments, other methods of pixel luminance calculation may be used. Pixel luminance of N pixels, i.e., $\{x_i\}_{i=1}^{N}$, in the scene is ranked in ascending order and the $k_{th}$ percentile $p_{kth}$ may be obtained as the $n_{th}$ pixel luminance value in the ordered list $\{\tilde{x}_i\}_{i=1}^{N}$ $$n = \left\lceil \frac{k}{100} \times N \right\rceil, \; p_{kth} = \tilde{x}_n$$

Note that the $k_{th}$ pixel luminance value above is defined as the smallest value in the ordered list, which satisfies that no more than k percent of data is less than it. In one or more embodiments, other definitions/approximations may be used.

In one or more embodiments, the initial Bezier curve generation processing 320 generates the coefficients by the ITM process 340. In some embodiments, a 10-th order Bezier curve is used for illustration, denoted by $\{p_i\}_{i=1}^{10}$. Bezier curves of different orders may also be used. Tuning parameters $\{g_i\}_{i=1}^{10}$ and an ITM curve is generated after the curve tuning for de-banding processing 330, denoted by $\{\tilde{p}_i\}_{i=1}^{10}$.

where $\tilde{p}_i = p_i g_i$. The tuned ITM of pixel luminance x is expressed as $$y = \sum_{i=1}^{10} \tilde{p}_i C_{10}^i x^i (1-x)^{10-i} \text{ where } C_{10}^i = \frac{10!}{i!(10-i)!}$$

are binomial coefficients.

Figure 4:
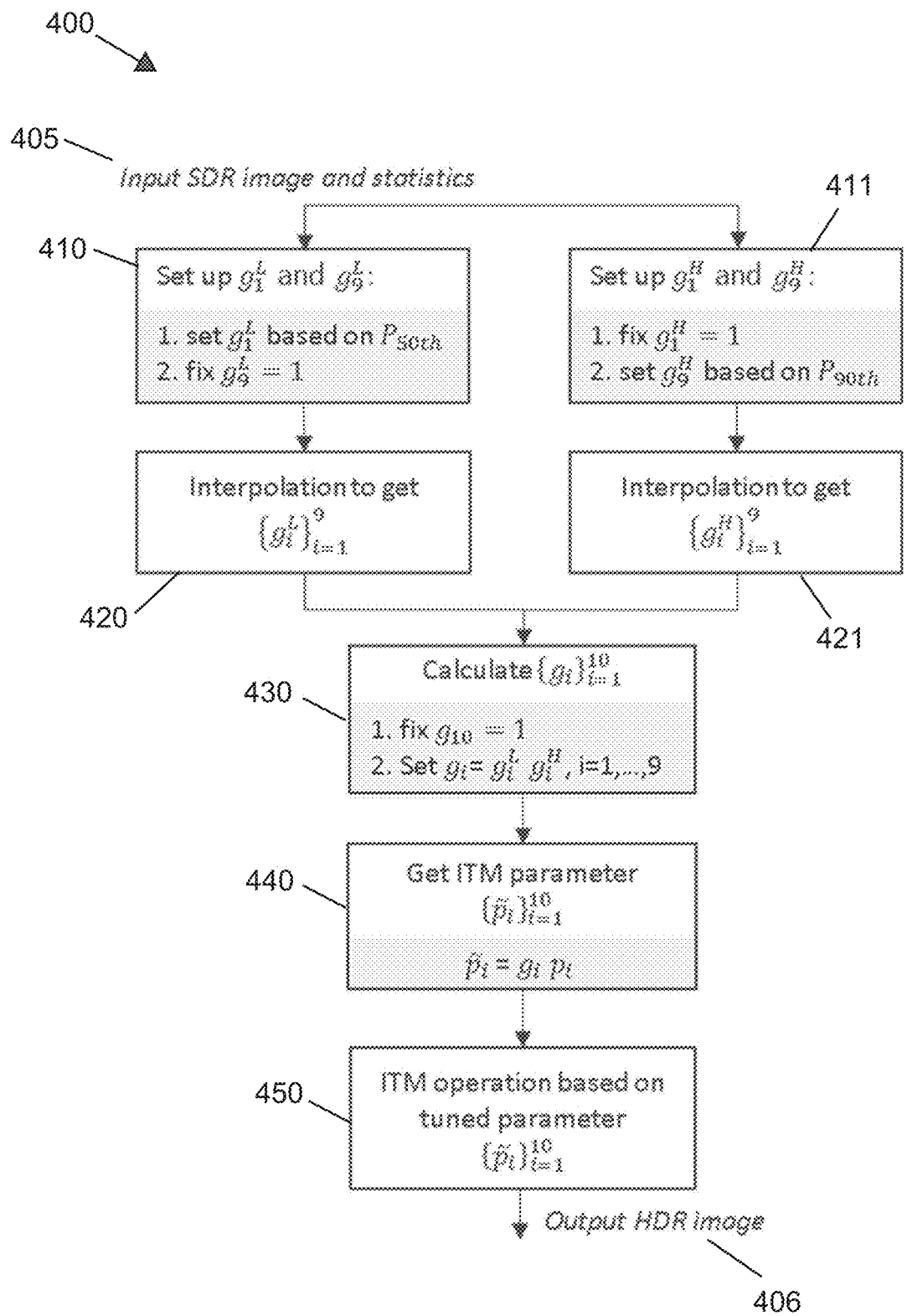
FIG. 4 illustrates a flow diagram of a de-banding process, according to some embodiments.

FIG. 4 illustrates a flow diagram of a de-banding process 400, according to some embodiments. In one or more embodiments, the input includes input SDR image(s) and statistics 405. The tuning parameter $g_i$ is designed as a continuous function of input image statistics, which is illustrated with $50^{th}$ and $90^{th}$ percentiles of luminance, i.e., $g_i(P_{50th}, P_{90th})$. Tuning parameters $g_i$ is generated by combining two sets of parameters, $g_i^L(P_{50th})$ and $g_i^H(P_{90th})$, which aim to flatten the lower and higher ends of the initial ITM curve, respectively:

$$g_i(P_{50th}, P_{90th}) = g_i^L(P_{50th}) g_i^H(P_{90th})$$

In some embodiments, $g_{10}=1$ to keep the initial coefficient $p_{10}$ unchanged and thus keep the peak luminance.

In one or more embodiments, in block 410 $g_i$ and $g_9$ are set as follows: g is set based on $P_{50th}$, and $g_9^L$ is fixed as 1. In block 411, $g_1^H$ and $g_9^H$ are set as follows: $g_1^H$ is fixed as 1, and $g_9^H$ is set based on $P_{90th}$. In block 420, interpolation is used to obtain $\{g_i^L\}_{i=1}^9$. In block 421, interpolation is used to obtain $\{g_i^H\}_{i=1}^9$. In block 430, $\{g_i\}_{i=1}^{10}$ is determined by fixing $g_{10}=1$ and setting $g_i=g_i^L g_i^H$, $i=1, \ldots, 9$. In block 440, the ITM parameter is obtained using: $\{\widetilde{p_i}\}_{i=1}^{10}$ and $\tilde{p}_i g_i p_i$. In block 450, an ITM operation is performed based on the tuned parameter: $\{\widetilde{p_i}\}_{i=1}^{10}$ that provides the output HDR image 406.

Figure 5:
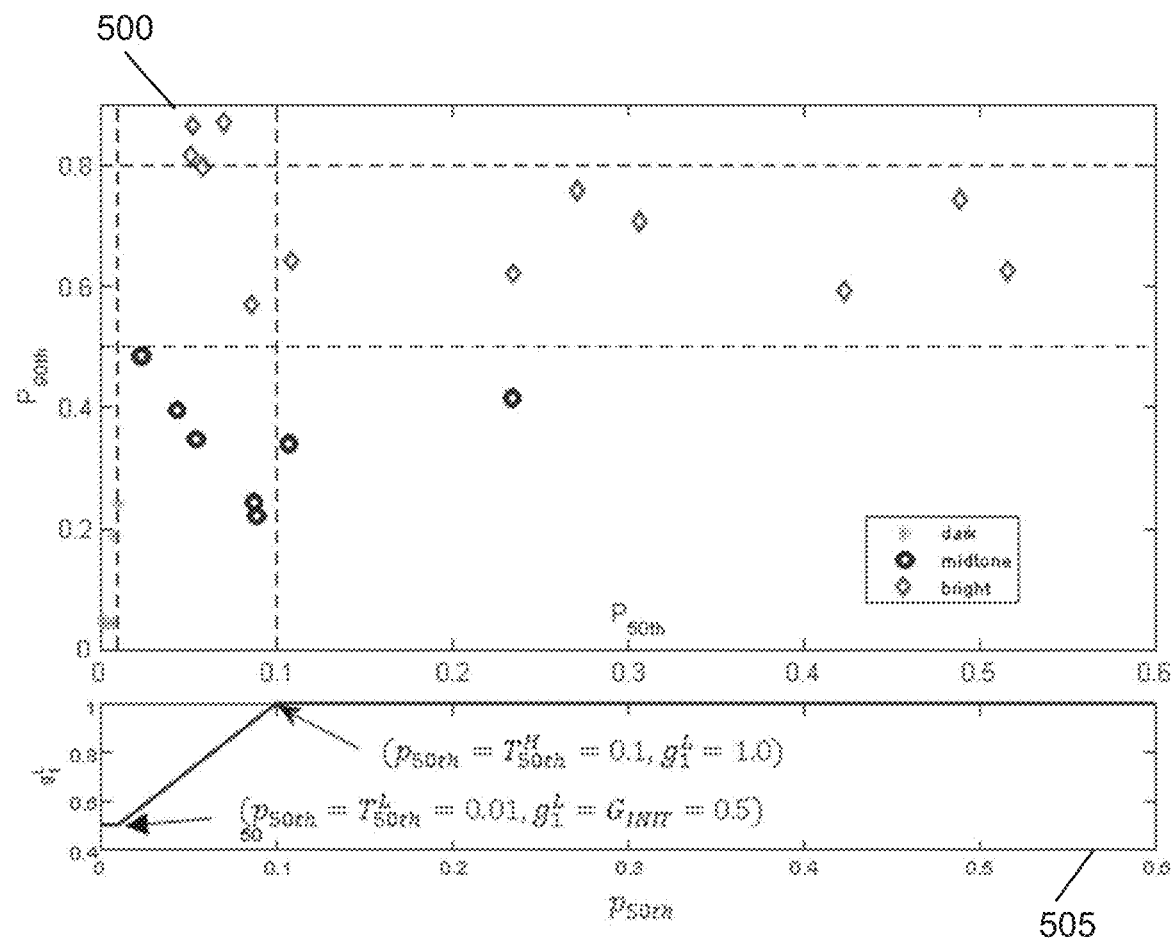
FIG. 5 illustrates an example scatter plot for images with different brightness and a graph for a linear interpolation function, according to some embodiments.

FIG. 5 illustrates an example scatter plot 500 for images with different brightness, and a graph 505 for a linear interpolation function, according to some embodiments. In one or more embodiments, a process for generating the tuning properties $g_i^L(P_{50th})$ for the lower end of an ITM curve includes the following. Two end points $g_1^L$ and $g_9^L$ are set up: $g_9^L$ is fixed as 1, and $g_1^L$ is calculated from linear interpolation based on $p_{50th}$, where $T_{50th}^L$ and $T_{50th}^H$ are two luminance thresholds:

$$g_1^L = \begin{cases} G_{INIT}, & p_{50th} \leq T_{50th}^L \\ 1, & p_{50th} \geq T_{50th}^H \\ G_{INIT} + \frac{1 - G_{INIT}}{T_{50th}^H - T_{50th}^L}(p_{50th} - T_{50th}^L), & \text{o.w.} \end{cases}$$

The process of generating the tuning parameters $g_i^L(P_{50th})$ for the lower end of the ITM curve further includes the following. Non-linear interpolation is performed to obtain $g_i^L$ ($i=1, \ldots, 9$) based on indices $$g_i^L = g_1^L + \frac{g_9^L - g_1^L}{f_9(\alpha_L, 1) - f_1(\alpha_L, 1)}(f_i(\alpha_L, 1) - f_1(\alpha_L, 1)),$$

where $f_i$ is the function used for interpolation, which is designed with the following properties:
a monotonically increasing function;

$$0 < f_i \leq 1;$$

$f_i$ approaches 1 quickly when i deviates from 1.

Figure 6:
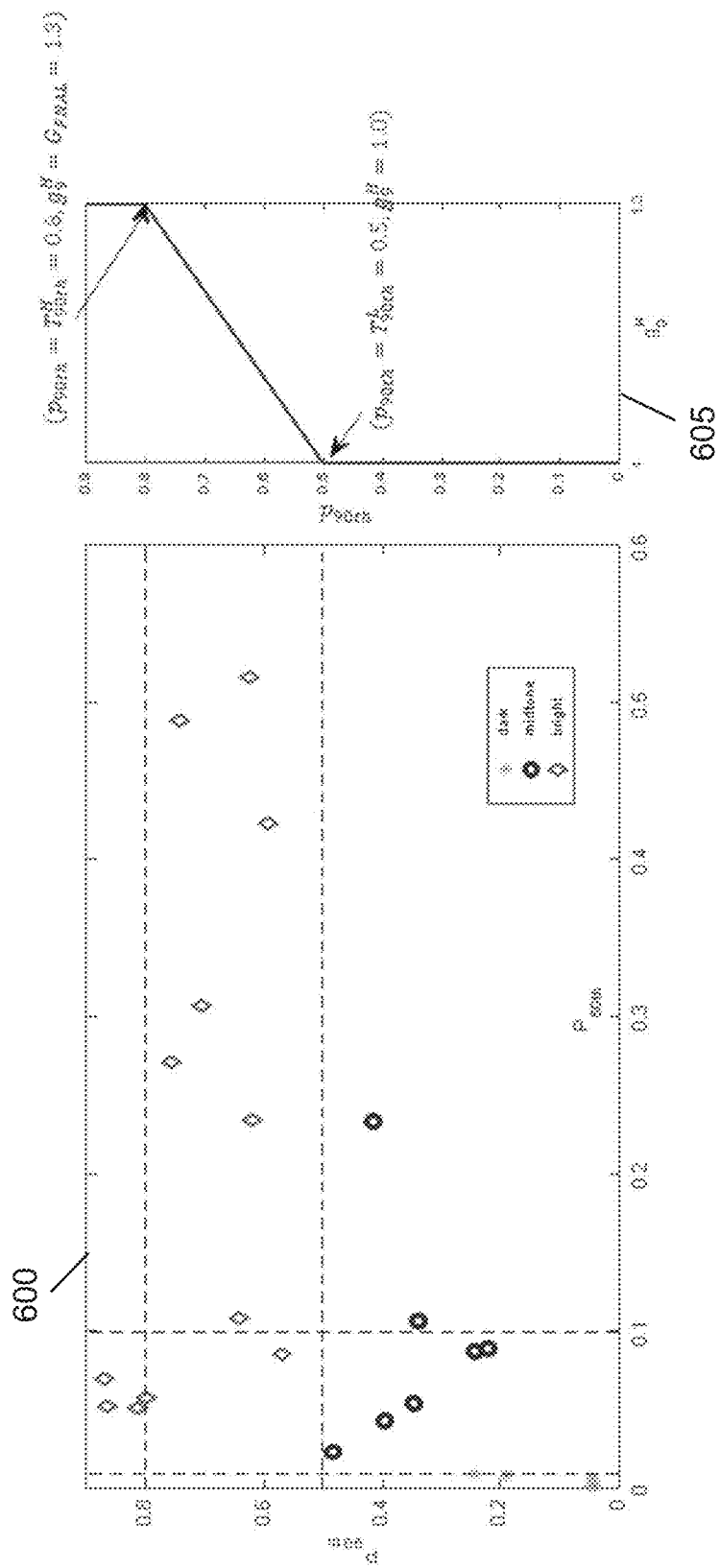
FIG. 6 illustrates yet another example scatter plot for images with different brightness and another graph for a linear interpolation function, according to some embodiments.

FIG. 6 illustrates yet another an example scatter plot 600 for images with different brightness and another graph 605 for a linear interpolation function, according to some embodiments. In one or more embodiments, a process of generating the tuning parameters $g_i^H(p_{90th})$ for the higher end of the ITM curve includes the following. Set up two end points $g_1^H$ and $g_p^H$, where $g_1^H$ is fixed as $g_1^H=1$, and $g_9^H$ is calculated from linear interpolation based on $p_{90th}$, where $T_{90th}^L$ and $T_{90th}^H$ are two luminance thresholds $$g_9^H = \begin{cases} G_{FNAL}, & p_{90th} \geq T_{90th}^H \\ 1, & p_{90th} \leq T_{90th}^L \\ 1 + \frac{G_{FNAL} - 1}{T_{90th}^H - T_{90th}^L}(p_{90th} - T_{90th}^L), & \text{o.w.} \end{cases}$$

In some embodiments, the process of generating the tuning parameters $g_i^H(p_{90th})$ for the higher end of ITM curve further includes the following. Non-linear interpolation is performed to obtain $g_i^H$ ($i=1, \ldots, 9$) based on indices $$g_i^H = g_1^H + \frac{g_9^H - g_1^H}{f_9(\alpha_H, 9) - f_1(\alpha_H, 9)}(f_i(\alpha_H, 9) - f_1(\alpha_H, 9)),$$

where $f_i$ is the function used for interpolation, which is designed with the following properties:
a monotonically decreasing function;

$$0 < f_i \leq 1;$$

$f_i$ approaches 1 quickly when i gets down from 9.

In some embodiments, design and implementation of the interpolation function $f_i(\alpha, \beta)$ includes the following: $f_i$ is designed as an (inverse) S-shape function as shown below:

$$f_i(\alpha, \beta) = \frac{1}{1 + e^{-\alpha(i-\beta)}}$$

where $sign(\alpha)$ decides the monotonicity: increasing or decreasing; $|\alpha|$ decides the steepness of the function: the size of range to tune; and $\beta$ denotes the 0.5 midpoint. In one or more embodiments, $f_i$ may be obtained from a look up table (LUT).

To save both $\{f_i(\alpha_L, 1)\}_{i=1}^9$ and $\{f_i(\alpha_H, 9)\}_{i=1}^9$, the size of the LUT is $18 \times 2^W$, where W is the bit-width of the system. When setting $\alpha_H \times -\alpha_L$, it is noted that $f_i(\alpha_L, 1) = f_{10-i}(\alpha_H, 9)$. In some embodiments, only $\{f_i(\alpha_L, 1)\}_{i=1}^9$ is saved. The size of the LUT is reduced to $9 \times 2^W$.

Figures 7A, 7B:
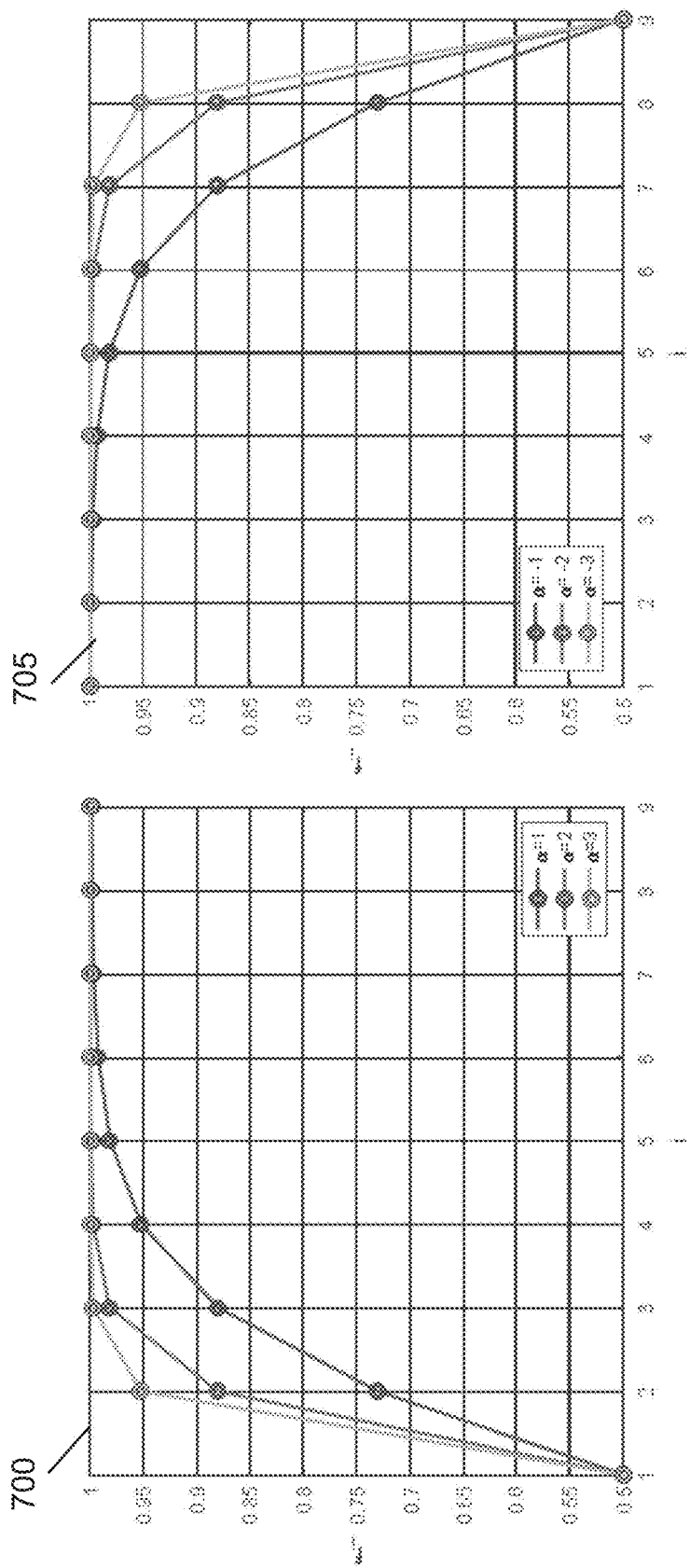
FIGS. 7A-B illustrate example graphs of functions with different parameters, according to some embodiments.

FIGS. 7A-B illustrate example graphs 700 and 705 of functions with different parameters, according to some embodiments. In one or more embodiments, the design and implementation of the interpolation function $f_i(\alpha,\beta)$ involves $f_i$ functions in calculating $g_i$ and $g_i^H$. For graph 700, $f_i(\alpha_L,\beta)$ is used for obtaining $g_i^L$, where:

$$\alpha_L > 0$$
$$\beta = 1$$

For graph 705, $f_i(\alpha_H,\beta)$ is used for obtaining $g_i^H$, where:

$$\alpha_H < 0$$
$$\beta = 9.$$

Figures 8A, 8B, 8C:
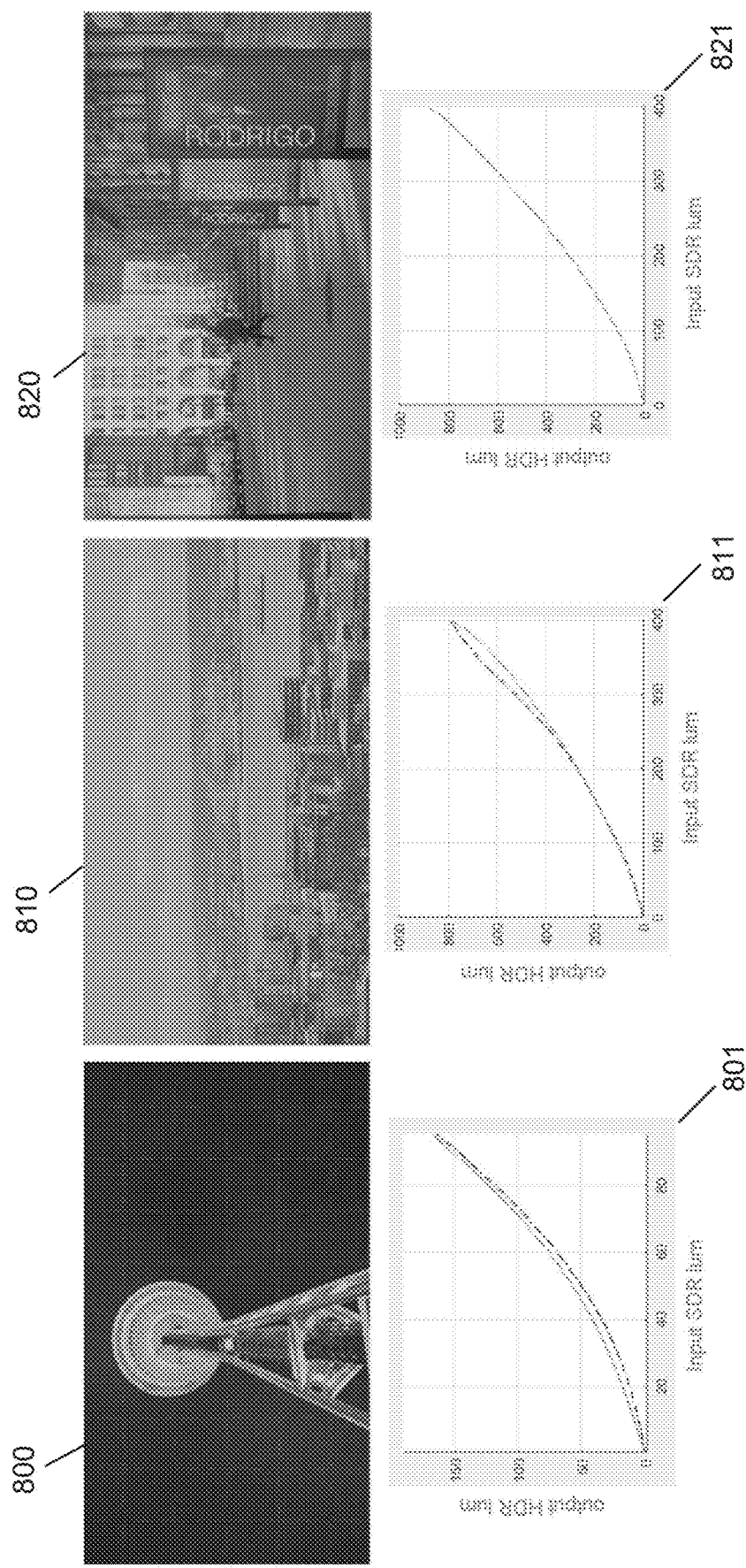
FIGS. 8A-C illustrate inverse tone mapping (ITM) curves for comparing before and after tuning for the associated example images, according to some embodiments.

FIGS. 8A-C illustrate ITM curves 801, 811 and 821 for comparing before and after tuning for the associated example images 800, 810 and 820, according to some embodiments. The images 800, 810 and 820 represent use cases for HDR-to-SDR conversion with the de-banding process 330 (FIG. 3) embedded into the ITM processing 340 (FIG. 3). The de-banding process 330 that is based on image statistics is configured to well flatten the banding-prone part of the ITM curve. The HDR-to-SDR conversion pipeline with the de-banding process 330 generates and displays HDR contents from SDR input with suppressed banding artifacts and mostly preserved mid-tone details.

FIG. 9 illustrates a process 900 for balancing a de-banding effect and preserving local detail for a display, according to some embodiments. In block 910, process 900 employs a de-banding process (e.g., de-banding process 330, FIG. 3) based on image statistics in a dynamic range conversion system, including HDR-to-SDR TM process or SDR-to-HDR ITM process. In block 920, process 900 performs, by a computing device (e.g., a computing processor/multiprocessor, etc.), the de-banding process in post-processing during a determination of one or more initial ITM explicit polynomial curve coefficients. In block 930, process 900 utilizes one or more parameters of a weighing function of the one or more initial ITM explicit curve coefficients as one or more controlling knots for balancing a de-banding effect and preserving local detail.

In some embodiments, process 900 includes the feature that the image statistics include luminance statistics.

In one or more embodiments, process 900 further provides that the polynomial curve coefficients are Bezier curve coefficients.

In one or more embodiments, process 900 further provides that the de-banding process is embedded into an SDR-to-HDR conversion platform without substantial system structure modification.

In some embodiments, process 900 additionally provides determining a luminance range vulnerable to one or more banding artifacts.

In one or more embodiments, process 900 further provides that processing all pixels globally based on the luminance statistics.

In some embodiments, process 900 further includes that the image statistics comprise information from SDR metadata.

In one or more embodiments, process 900 additionally includes the feature that the image statistics comprise information computed by the computing device.

In some embodiments, the SDR content is transferred to a TV set that supports the SDR-to-HDR extension. In one or more embodiments, the statistics of images (e.g., luminance percentiles or histogram) may be obtained by either of the following: extracted from the SDR metadata, which is delivered with the SDR content; or calculated on device where the SDR content is transferred to. The on-device SDR-to-HDR conversion processing generates a Bezier ITM curve based on the image statistics (e.g., luminance percentiles). The de-banding process 330 (FIG. 3) determines the illuminance range to tune, generates the tuning parameters based on the image statistics and adjusts the initial ITM curve. In some embodiments, the TV's H/W processer applies the tuned ITM curve on the input SDR signals to generate the HDR outputs. In one or more embodiments, the TV's H/W processer converts the color space from Rec. 709 to DCI-P3 or BT2020 color space that current or future HDR TV supports.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:
1. A computer-implemented method comprising:
employing a de-banding process based on image statistics in a dynamic range conversion system, including high dynamic range (HDR) to standard dynamic range (SDR) tone mapping (TM) process or SDR-to-HDR inverse tone mapping (ITM) process;

performing, by a computing device, the de-banding process in post-processing during a determination of one or more initial ITM explicit polynomial curve coefficients; and utilizing one or more parameters of a weighing function of the one or more initial ITM explicit curve coefficients as one or more controlling knots for balancing a de-banding effect and preserving local detail.

2. The method of claim 1, wherein the image statistics comprise luminance statistics.

3. The method of claim 2, wherein the polynomial curve coefficients are Bezier curve coefficients.

4. The method of claim 3, wherein the de-banding process is embedded into an SDR-to-HDR conversion platform without substantial system structure modification.

5. The method of claim 3, further comprising:
determining a luminance range vulnerable to one or more banding artifacts.

6. The method of claim 3, further comprising:
processing all pixels globally based on the luminance statistics.

7. The method of claim 3, wherein the image statistics comprise information from SDR metadata.

8. The method of claim 3, wherein the image statistics comprise information computed by the computing device.

9. A non-transitory processor-readable medium that includes a program that when executed by a processor performs balancing a de-banding effect and preserving local detail for a display, comprising:
employing a de-banding process, by the processor, based on image statistics in a dynamic range conversion system, including high dynamic range (HDR) to standard dynamic range (SDR) tone mapping (TM) process or SDR-to-HDR inverse tone mapping (ITM) process;
performing the de-banding process in post-processing during a determination of one or more initial ITM explicit polynomial curve coefficients; and
utilizing one or more parameters of a weighing function of the one or more initial ITM explicit curve coefficients as one or more controlling knots for balancing a de-banding effect and preserving local detail.

10. The non-transitory processor-readable medium of claim 9, wherein the image statistics comprise luminance statistics.

11. The non-transitory processor-readable medium of claim 10, wherein the polynomial curve coefficients are Bezier curve coefficients.

12. The non-transitory processor-readable medium of claim 11, wherein the de-banding process is embedded into an SDR-to-HDR conversion platform without substantial system structure modification.

13. The non-transitory processor-readable medium of claim 11, further comprising:
determining a luminance range vulnerable to one or more banding artifacts.

14. The non-transitory processor-readable medium of claim 11, further comprising:
processing all pixels globally based on the luminance statistics.

15. The non-transitory processor-readable medium of claim 11, wherein:
the image statistics comprise information from SDR metadata; and
the image statistics comprise information computed by the computing device.

16. An apparatus comprising:
a memory storing instructions; and
at least one processor executes the instructions including a process configured to:
employ a de-banding process based on image statistics in a dynamic range conversion system, including high dynamic range (HDR) to standard dynamic range (SDR) tone mapping (TM) process or SDR-to-HDR inverse tone mapping (ITM) process;
perform the de-banding process in post-processing during a determination of one or more initial ITM explicit polynomial curve coefficients; and
utilize one or more parameters of a weighing function of the one or more initial ITM explicit curve coefficients as one or more controlling knots for balancing a de-banding effect and preserving local detail.

17. The apparatus of claim 16, wherein the image statistics comprise luminance statistics.

18. The apparatus of claim 17, wherein the polynomial curve coefficients are Bezier curve coefficients.

19. The apparatus of claim 18, wherein the de-banding process is embedded into an SDR-to-HDR conversion platform without substantial system structure modification.

20. The apparatus of claim 18, wherein:
the process is further configured to:
determine a luminance range vulnerable to one or more banding artifacts; and
process all pixels globally based on the luminance statistics; and
the image statistics comprise information from SDR metadata; and
the image statistics comprise information computed by the computing device.

* * * * *